June 28, 1938.   E. A. PRUDHOMME   2,121,981
PROCESS OF AND APPARATUS FOR MANUFACTURING SACCHAROSE FROM FORMALDEHYDE
Filed Dec. 3, 1934
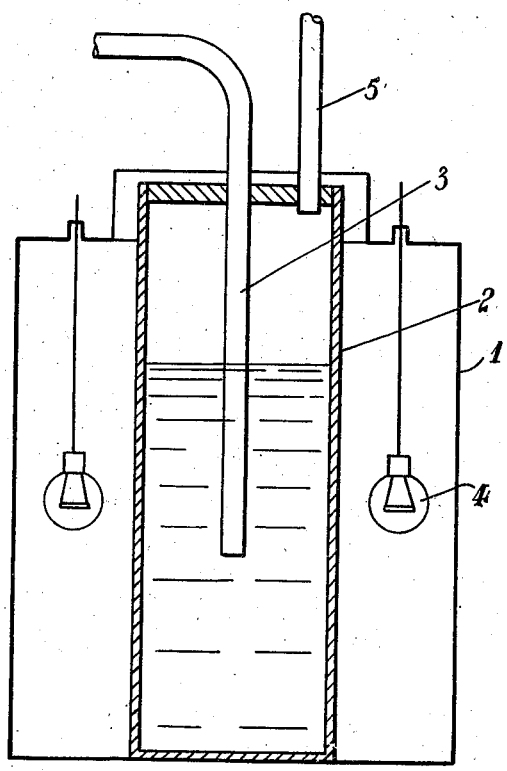
Inventor
Eugène Albert Prudhomme
By Pennie Davis Marvin & Edmonds
Attorneys Patented June 28, 1938

2,121,981

UNITED STATES PATENT OFFICE 2,121,981

PROCESS OF AND APPARATUS FOR MANUFACTURING SACCHAROSE FROM FORMALDEHYDE

Eugène Albert Prudhomme, Kremlin-Bicetre, France, assignor, by mesne assignments, to Carboxhyd Ltd., Geneva, Switzerland, a joint-stock company of Switzerland Application December 3, 1934, Serial No. 755,698
In France July 19, 1930

6 Claims. (Cl. 204—31)

This invention relates to a process of and apparatus for the manufacture of saccharose from formaldehyde.

According to the process of the present invention, polymerization of the formaldehyde, for its conversion to saccharose is brought about by a source of luminous energy, either natural or artificial, the rays of which pass through reddish-orange colored filters which stop the rays which are unnecessary for, or harmful to, the desired transformation. Said process is, moreover, characterized by the fact that, as the polymeric products are formed, they are fixed by means of alkaline-earth oxides; otherwise the polymerization would be unstable.

Thus are practically and economically carried out the various stages of polymerization of formaldehyde up to the hexoses, and the junction of said hexoses for the formation of hexobiose (saccharose) which as it forms fixes on to the alkaline-earth oxides held in suspension in water and placed in the reaction chamber.

The process according to the invention may, for example, be carried out as hereinafter described, the apparatus used being the one shown on the accompanying drawing.

The formaldehyde is passed into a reaction chamber which is essentially constituted by a cylinder 1 made of sheet metal, the inner wall of which may be colored reddish orange. Within said cylinder is arranged a transparent glass receptacle 2 which constitutes the reaction chamber proper and which contains milk of lime in which dips a pipe 3 by which enters the formaldehyde.

Between the cylinder 1 and the receptacle 2 are arranged a certain number of electric lamps 4 (four lamps for example of 25 watts each) the bulbs of which are colored reddish orange. The gases which are not absorbed by the milk of lime are exhausted by the pipe 5.

Owing to the luminous action of the electric lamps 4 the formaldehyde which bubbles through the receptacle 2 polymerizes and forms a saccharate of lime with the lime.

Said saccharate of lime is then treated in a separate chamber (not illustrated) by a current of $CO_2$, in order to precipitate the lime in the state of carbonate and to liberate the saccharose formed, which can be separated out by filtering. The syrup of sugar obtained is then treated according to the known methods.

In the above-mentioned apparatus, the bulbs may be colorless, in which case the receptacle 2 is tinted reddish orange.

I claim:

1. The process for manufacturing saccharates from formaldehyde which comprises passing a gas containing formaldehyde into water containing an alkaline-earth oxide, and subjecting the water containing the formaldehyde and the alkaline-earth oxide to the action of rays of luminous energy filtered through a reddish-orange-colored medium.

2. In apparatus for the manufacture of saccharates from formaldehyde, the combination comprising a transparent glass receptacle forming a reaction chamber, means for introducing formaldehyde into said reaction chamber, means for providing a source of light, a reddish-orange-colored filter through which the light is passed to the reaction chamber.

3. In apparatus for the manufacture of saccharate from formaldehyde, the combination comprising a transparent receptacle forming a reaction chamber, means for introducing formaldehyde into said reaction chamber, a jacket surrounding said chamber the inner wall of which has a reddish-orange-colored reflecting surface, and means for providing a source of luminous energy between the jacket and the receptacle.

4. In apparatus for the synthesis of organic compounds, the combination comprising means for providing a source of luminous energy, a transparent receptacle forming a chamber within which the synthesis is effected, means for introducing formaldehyde into said chamber and a ray-filtering medium interposed between the source of luminous energy and said reaction chamber, said filtering medium having the properties of passing only reddish-orange rays.

5. In apparatus for the synthesis of organic compounds, the combination comprising means providing a source of luminous energy, a glass receptacle forming a chamber within which the synthesis is effected, means for introducing formaldehyde into said chamber and a ray-filtering medium interposed between the source of luminous energy and the reaction chamber which is adapted to pass only rays corresponding to the orange rays of the solar spectrum.

6. The process of producing saccharose from formaldehyde which comprises passing formaldehyde into an aqueous medium containing an alkaline-earth oxide, subjecting the aqueous medium containing the formaldehyde and the alkaline-earth oxide to rays of luminous energy which will pass a reddish-orange-colored filter, thereby, to form a saccharate of the alkaline-earth metal, and treating said formed saccharate with carbon dioxide to liberate saccharose therefrom.

EUGÈNE ALBERT PRUDHOMME.